M. H. DAMERELL.
ADJUSTABLE CLAMPING DEVICE.
APPLICATION FILED DEC. 18, 1918.
1,321,895.
Patented Nov. 18, 1919.
3 SHEETS—SHEET 2.
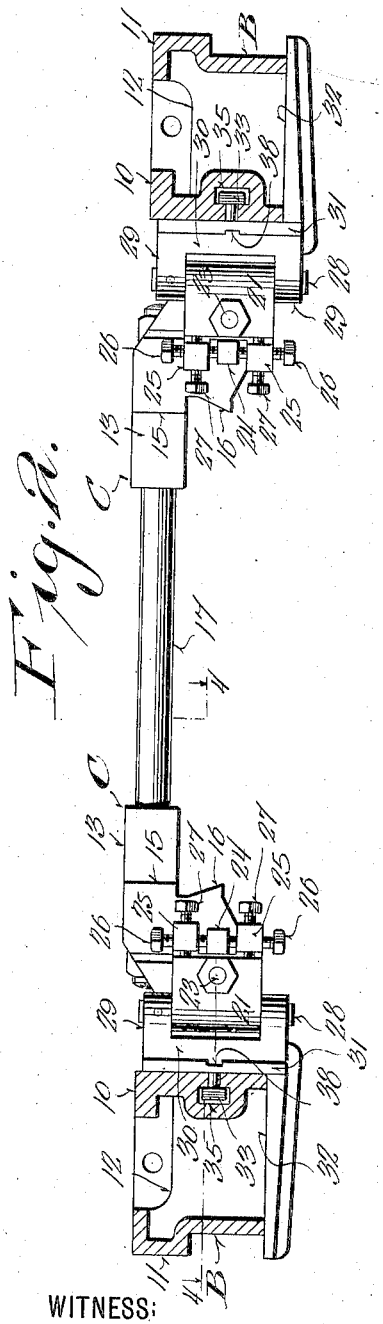
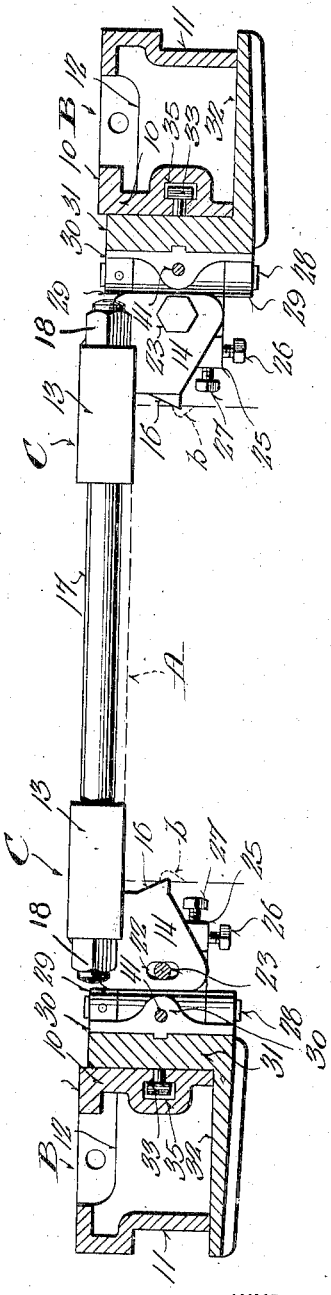
WITNESS:
J. P. Britt
INVENTOR
Mark H. Damerell
BY
ATTORNEY

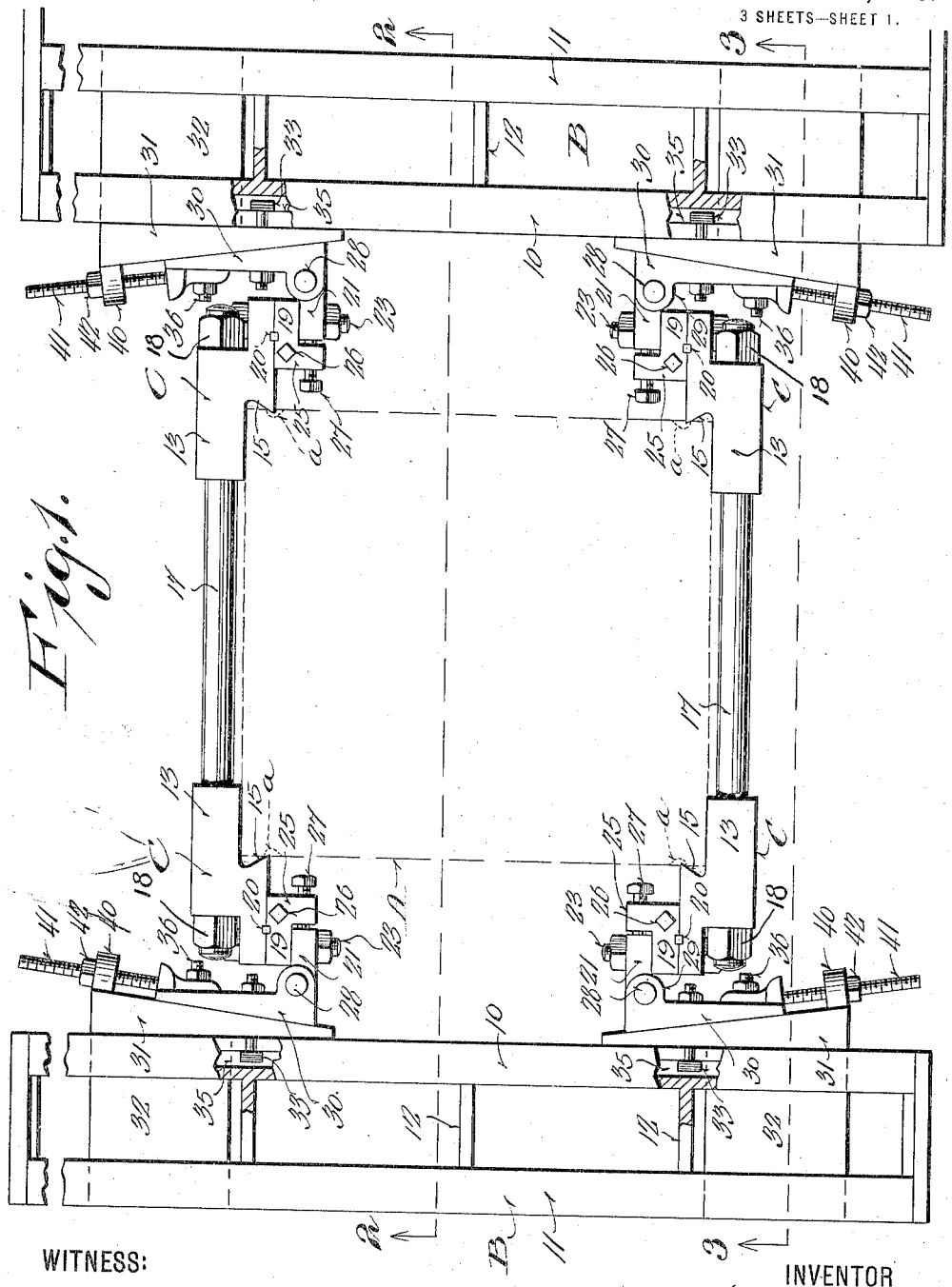

UNITED STATES PATENT OFFICE.

MARK H. DAMERELL, OF WORCESTER, MASSACHUSETTS.

ADJUSTABLE CLAMPING DEVICE.

1,321,895.  Specification of Letters Patent.  Patented Nov. 18, 1919.

Application filed December 18, 1918. Serial No. 267,340.

*To all whom it may concern:*

Be it known that I, MARK H. DAMERELL, a citizen of the United States, and resident of Worcester, in the county of Worcester and State of Massachusetts, have invented certain new and useful Improvements in Adjustable Clamping Devices; and I do hereby declare that the following is a full, clear, and exact description thereof.

In a shaping operation on a very heavy and unwieldy work object, such as a steam hammer base, column end or the like, a portable shaper machine such as disclosed in Patent No. 1,275,404, granted to me August 13, 1918, is attached to the work article for the shaping operation, it being more convenient to thus attach a machine to the work article than to place the work article in a permanently fixed machine, and my invention relates to new and useful improvements in means for attaching such a portable machine to a work article, such machines usually comprising a pair of main support members which must be held in parallel relation on the work article to procure proper operation of the machine, and which must be properly alined on the work article in accordance with the plane of the cutting surface.

Inasmuch as the faces of the work block to which it is desired to attach a portable machine may be somewhat uneven, it is primarily the object of my invention to provide a clamping device which is adjustable in such manner as to compensate for irregularities of the surfaces of the blocks in positioning the main supports of a machine for proper operation thereof, this adjustment also serving to compensate for relative displacement of the clamping dogs of the device with respect to the true position of the support members in the attachment of said dogs to the work article.

A more specific object is to provide for universal independent adjustment of the main support members of a portable machine with respect to the clamping device subsequent to the attachment of the clamping device on a work block, whereby to most readily procure proper relation of the support members to each other and to the work block.

A further object resides in the provision of a clamping device of this character which is comparatively simple in nature and which affords a positive holding in its various adjustments.

With the above and other objects and advantages in view, the invention resides more particularly in the novel combination, formation and arrangement of parts hereinafter described in detail and pointed out in the appended claims.

In the accompanying drawings:

Figure 1 is a plan view of a clamping device embodying my invention and carrying a pair of main support members for a portable shaping machine.

Fig. 2 is a sectional view taken on the line 2—2 of Fig. 1, and showing one of the clamp sections in elevation.

Fig. 3 is a sectional view on the line 3—3 of Fig. 1.

Figure 4:
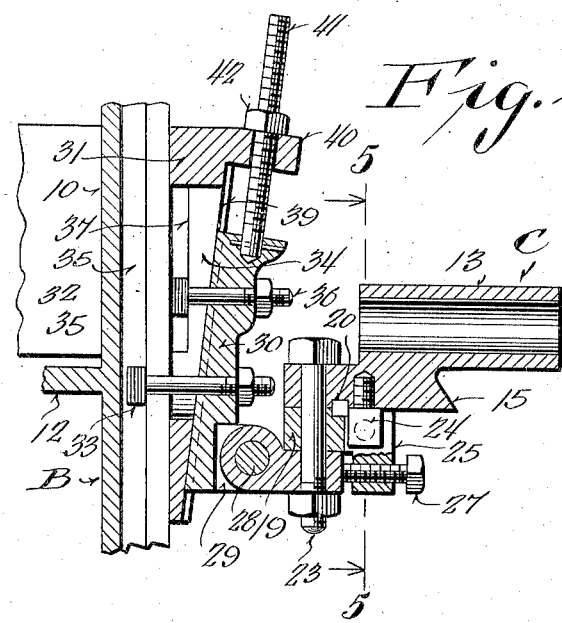
Fig. 4 is a horizontal sectional view on the line 4—4 of Fig. 2.
Figure 5:
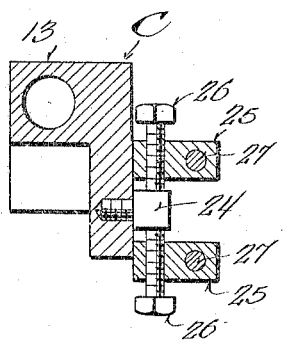
Fig. 5 is a detail sectional view on the line 5—5 of Fig. 4.

Referring now more particularly to the accompanying drawings, A designates in dotted line a block of work material and B designates each of a pair of main support members for a portable shaping machine, each of said support members comprising an inner sill 10 and an outer sill 11 connected at spaced intervals with the inner sill by transverse sills 12.

My improved clamping device comprises, in its present embodiment, a pair of independent clamping sections adapted to carry adjacent ends of the pair of main supports B. Each of these clamping sections includes a pair of clamping dog blocks C, each of these dog blocks including an elongated sleeve portion 13, and a portion 14 depending at the inner side of the sleeve portion, said depending portion being flattened longitudinally of the sleeve, with its inner edge disposed intermediately of the sleeve, and its outer edge extending longitudinally outward of the sleeve. The inner and bottom faces of the sleeve are flattened to form clamping surfaces engageable selectively against either the top or side face of the work block. Projecting inwardly from the intermediate portion of the sleeve is a gripping tooth 15, and a second gripping tooth 16 projects from the inner edge of the depending portion 14 of the dog block. Thus, the clamping dog C may be engaged either with the top face of the work block or with the side face thereof. In Fig. 1 the clamping dogs are shown engaged with the side faces of the work block, with their teeth 15 projecting into notches a cut in the ends of the block. In Fig. 3 the clamping dogs are shown engaged with the top faces of the work block, with the teeth 16 engaged in notches b of the work block. It is appreciated that either method of attachment of the clamp block may be employed, in accordance with the conditions encountered. The clamp dogs of each clamping section are connected by an elongated bolt 17 passed through the sleeve portions 13 of the dogs and having nuts 18 threaded on their ends engaging the ends of the sleeve portions to draw the dogs together.

In applying my clamping device to a work block, notches a or b are cut in the ends of the work block A to receive the teeth 15 or 16, the inner sides of these teeth being beveled, as shown. Thus upon tightening the nuts 18, the dogs will be drawn together, and by reason of the inclined inner faces of their teeth, the adjacent flat faces of the sleeve portions 13 will be drawn against the sides or top of the work block to effect a positive rigid securement of the clamping dogs to the work block.

Vertical adjustment blocks 19 are disposed at the inner sides of each dog portion 14 and the opposed faces of the dog 14 and block 19 are provided with vertical grooves coöperating to receive a squared key 20 whereby a spline connection is afforded. A pivot block 21 is disposed at the inner side of the vertical adjustment block 19, and passed through the blocks 19 and 21 and through a vertically elongated slot 22 in the depending dog portion 14 is a connecting bolt 23. For procuring vertical adjustment between the block 19 and the clamping dog, a stud 24 is threaded in the inner side of the dog portion 14 and lies between inwardly directed arms 25 on the upper and lower ends of the block 19, this stud being provided with horizontal flat faces against which are engaged the inner ends of set screws 26 threaded vertically through the arms 25. Thus upon rotating said set screws, the block 19 may be adjusted vertically in either direction and positively held in such adjusted position. The outer ends of the arms 25 of the block 19 are laterally directed in spaced relation to the inner end of the pivot block 21 and threaded through these laterally directed end portions are set screws 27 bearing against the pivot block above and below the bolt 23 whereby to pivotally adjust said block in a vertical plane.
A vertical pivotal bolt 28 is passed through the outer end of each pivot block 21, and mounted on said bolt above and below the said block are inwardly extending end lugs 29 of a horizontal adjustment plate 30 which is elongated transversely of the dog member and which has an inclined outer face engageable against the correspondingly inclined inner face of the wall portion 31 of a carrying bracket for one of the main support members B of the machine, said bracket including a horizontally outwardly extending seating ledge 32 for the support member at the lower edge of the wall. The plate 30, bracket wall 31, and the inner sill 11 of the support member are connected together by a bolt 33 passed through the plate 30 and through a longitudinal slot 34 in the wall 31 and through the reduced mouth portion of a longitudinal groove 35 in the outer side of the sill 10, the head of such bolt sliding in, and being retained in the enlarged inner portion of the groove. The block 30 and bracket wall 31 are further connected by a bolt 36 passed through the outer end portion of the horizontal adjustment plate and through the slot 34 of the bracket wall 31, with the head of said bolt sliding in an enlarged inner portion 37 of said slot 34. In addition to the bolts, the plate 30 and bracket wall 31 are held against relative lateral movement by a longitudinal rib 38 on the plate 30 slidable in a corresponding groove 39 in the inner face of the wall. For shifting the bracket inwardly, a lug 40 projects inwardly from the outer end of the wall 31 and slidably passed through this lug is a bolt 41 which has its inner end threaded in the adjacent end of the plate 30, and which has a nut 42 threaded thereon outwardly of the lug 40 and adapted to bear against the lug 40 to thus shift the bracket inwardly upon rotation of the bolt, it being obvious that the nuts of the bolts 33 and 36 must first be loosened, and that when the nuts of said bolts are tightened, a positive clamp is procured, holding all of the parts rigidly against relative movement to thus maintain the desired adjustments.

A comparatively simple device has thus been provided which may be most readily applied to a work block in a manner procuring an approximate relation of the machine support members B carried by its brackets, and which may then be manipulated to procure exact alinement and proper relation of the support members. Vertical adjustment of the blocks 19 in the manner set forth obviously serves to procure a general vertical horizontal alinement of the positions of the support members B, said support members B being swung vertically by the adjustment of the pivot block 21 procured by the bolts 27. The support members when thus placed in the proper horizontal plane, may be adjusted to secure their exact parallel relation to each other and to the direction of cut desired by shifting the wedge-shaped walls 31 of the carrying brackets inwardly or outwardly by means of the connections set forth.

While I have shown and described a preferred embodiment of my invention, it is obvious that various changes and modifications of structure may be employed without departing in any manner from the spirit of the invention as embodied in the accompanying claims.

What is claimed is:

1. A clamping device of the character described comprising a pair of clamping sections each including a pair of clamping dogs movable toward and away from each other for engagement with a work member, and a supporting bracket carried by each dog and universally adjustable with respect thereto.

2. A clamping device of the character described including a plurality of clamping dogs, means connecting said dogs for procuring clamping relation of said dogs to work material, and supporting brackets carried by the dogs and universally adjustable with respect thereto.

3. A clamping device of the character described including a plurality of clamping dogs, means connecting said dogs for procuring clamping relation of said dogs to work material, a vertically adjustable block carried by each dog, a bracket carried by each block in pivotal connection therewith, and means for holding said bracket against pivotal movement.

4. A clamping device of the character described including a plurality of clamping dogs, means connecting said dogs for procuring clamping relation of said dogs to work material, a vertically adjustable block carried by each dog, a bracket carried by each block in universal pivotal connection therewith, and means for holding said bracket against pivotal movement.

5. A clamping device of the character described including a plurality of clamping dogs, means connecting said dogs for procuring clamping relation of said dogs to work material, a vertically slidable block carried by each dog, a supporting bracket carried by each block, spaced arms projecting from each block, a stud on each dog between said arms, and set screws threaded in said arms and bearing against the stud.

6. A clamping device of the character described including a plurality of clamping dogs, means connecting said dogs for procuring clamping relation of said dogs to work material, a vertically slidable block carried by each dog, a bracket block pivotally carried by each slidable block, spaced arms projecting from each slidable block, a stud on each dog between said arms, set screws threaded in said arms and bearing against the stud, lateral extensions on the arms, and set screws threaded in said lateral extensions and bearing against the bracket blocks.

7. A clamping device of the character described comprising a pair of clamping sections each including a pair of clamping dogs movable toward and away from each other for engagement with a work member, a vertically slidable block carried by each dog, means for holding said block against slidable movement relative to the dog, a block pivoted on each slidable block for vertical pivotal movement, means for holding said block against pivotal movement, a bracket connected with each pivotal block for free horizontal pivotal movement with respect to the pivot block, and means for securing each bracket to the end of a supporting beam.

8. A clamping device of the character described comprising a pair of clamping sections each including a pair of clamping dogs movable toward and away from each other for engagement with a work member, a vertically slidable block carried by each dog, means for holding said block against slidable movement relative to the dog, a block pivoted on each slidable block for vertical pivotal movement, means for holding said block against pivotal movement, a bracket connected with each pivotal block for free horizontal pivotal movement with respect to the pivot block, and means for securing each bracket to the end of a supporting beam.

9. A clamping device of the character described comprising a pair of clamping sections each including a pair of clamping dogs movable toward and away from each other for engagement with a work member, a vertically slidable block carried by each dog, means for holding said block against slidable movement relative to the dog, a block pivoted on each slidable block for vertical pivotal movement, means for holding said block against pivotal movement, a horizontal adjustment block pivotally connected with each pivot block and having an inclined face, and a bracket having a coacting inclined face and shiftably secured to each horizontal adjustment block whereby to adjust the bracket toward and away from the block upon relative shifting movement.

10. A clamping device of the character described including a plurality of clamping dogs, means connecting said dogs for procuring clamping relation of said dogs to work material, a slotted portion on each dog provided with a vertically elongated slot, a block engaging against said slotted dog portion and in spline connection therewith, a pivot block, a bolt passed through the slot of the dog portion and through the first named block and through the pivot block, a bracket carried by the pivot block, and means for holding said blocks and dog against relative movement.

11. A clamping device of the character described including a plurality of clamping dogs, means connecting said dogs for procuring clamping relation of said dogs to work material, a slotted portion on each dog provided with a vertically elongated slot, a block engaging against said slotted dog portion and in spline connection therewith, a pivot block, a bolt passed through the slot of the dog portion and through the first named block and through the pivot block, a bracket carried by the pivot block, and means carried by the first named block for holding the dog and the slide block against movement relative thereto.

In testimony that I claim the foregoing I have hereunto set my hand at Worcester, in the county of Worcester and State of Massachusetts.

MARK H. DAMERELL.